(12) United States Patent
Cao et al.

(10) Patent No.: US 11,391,972 B2
(45) Date of Patent: Jul. 19, 2022

(54) CURVED PANEL AND DISPLAY DEVICE

(71) Applicant: Shenzhen China Star Optoelectronics Semiconductor Display Technology Co., Ltd., Shenzhen (CN)

(72) Inventors: Jie Cao, Shenzhen (CN); Jianhong Chen, Shenzhen (CN); Peng Du, Shenzhen (CN); Jianjian Ying, Shenzhen (CN); Tienchun Huang, Shenzhen (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 260 days.

(21) Appl. No.: 16/640,489

(22) PCT Filed: Dec. 27, 2019

(86) PCT No.: PCT/CN2019/129236
§ 371 (c)(1),
(2) Date: Feb. 20, 2020

(87) PCT Pub. No.: WO2021/120310
PCT Pub. Date: Jun. 24, 2021

(65) Prior Publication Data
US 2021/0405427 A1    Dec. 30, 2021

(30) Foreign Application Priority Data
Dec. 16, 2019  (CN) .......................... 201911296700.9

(51) Int. Cl.
G02F 1/1333 (2006.01)
G02F 1/1337 (2006.01)

(52) U.S. Cl.
CPC .. *G02F 1/133305* (2013.01); *G02F 1/133761* (2021.01)

(58) Field of Classification Search
None
See application file for complete search history.

(56) References Cited

U.S. PATENT DOCUMENTS

2015/0277189 A1   10/2015   Kim et al.
2016/0026028 A1   1/2016    Park et al.
(Continued)

FOREIGN PATENT DOCUMENTS

CN   1949062 A    4/2007
CN   105700245 A  6/2016
(Continued)

*Primary Examiner* — Richard H Kim
(74) *Attorney, Agent, or Firm* — Taft Stettinius & Hollister LLP

(57) ABSTRACT

The present disclosure provides a curved panel and a display device that include a first substrate, a second substrate, and a liquid crystal. The liquid crystal layer includes a plurality of first liquid crystal molecules near the first substrate, and a plurality of second liquid crystal molecules near the second substrate. The curved panel includes a central region, a first region and a second region located at both sides of the central region. The second substrate is disposed near a light-emitting side of the curved panel. A pretilt angle of the first liquid crystal molecules is greater than a pretilt angle of the second liquid crystal molecules.

18 Claims, 2 Drawing Sheets

(56) References Cited

U.S. PATENT DOCUMENTS

2017/0160593 A1* 6/2017 Cho ................ C08F 222/1045
2018/0101070 A1   4/2018 Song et al.
2018/0180948 A1   6/2018 Zhao

FOREIGN PATENT DOCUMENTS

| CN | 106200069 A | 12/2016 |
|---|---|---|
| CN | 107894674 A | 4/2018 |
| JP | 3183647 B2 | 7/2001 |

\* cited by examiner

CURVED PANEL AND DISPLAY DEVICE

CROSS-REFERENCE TO RELATED APPLICATIONS

This application is a U.S. National Phase of International PCT Application No. PCT/CN2019/129236 filed Dec. 27, 2019, which claims the benefit of Chinese Patent Application Serial No. 201911296700.9 filed Dec. 16, 2019, the contents of each application are incorporated herein by reference in their entirety.

FIELD OF INVENTION

The present disclosure relates to the display field, and more particularly, to a curved panel and a display device.

BACKGROUND OF INVENTION

General liquid crystal display devices include array substrates, color film substrates, and liquid crystal layers between the array substrates and the color film substrates. Pixel electrode layers are disposed on the array substrates, and common electrodes are disposed on the color film substrates. The liquid crystal display devices drive liquid crystal deflection by voltage difference between the pixel electrodes and the common electrodes, so that the liquid crystal display devices display images.

Compared to flat liquid crystal display panels, curved liquid crystal display panels have wider-viewing angles and a better three-dimensional effect. Therefore, it can bring a better visual experience to the most users. However, after the curved liquid crystal panels are bending, liquid crystal molecules inside thereof will change optical characteristics due to stress, so that the liquid crystal display panels have problems such as uneven display brightness and reduced sharpness.

Therefore, at present, a new type of curved panels is urgently needed to solve the above problems.

SUMMARY OF INVENTION

The present disclosure provides a curved panel and a display device to solve the technical problem of uneven brightness of the current curved panel.

The present disclosure provides a curved panel. The curved panel comprises a first substrate, a second substrate, a liquid crystal layer between the first substrate and the second substrate. The liquid crystal layer comprises a plurality of first liquid crystal molecules near the first substrate, and a plurality of second liquid crystal molecules near the second substrate, wherein one of the first liquid crystal molecules corresponds to one of second liquid crystal molecules. The curved panel comprises a central region, a first region located at one side of the central region, and a second region located at the other side of the central region. The second substrate is disposed near a light-emitting side of the curved panel. Wherein a pretilt angle of the first liquid crystal molecules is greater than a pretilt angle of the second liquid crystal molecules in the first region and the second region.

In the curved panel of the present disclosure, the first substrate is one selected from an array substrate or a color film substrate, the second substrate is one selected from the array substrate or the color film substrate, and the first substrate is the one selected different from the selected one of the second substrate.

In the curved panel of the present disclosure, each of the pretilt angle of any of the first liquid crystal molecules is equal and each of the pretilt angle of any of the second liquid crystal molecules is equal in a direction from the central region to the first region or the second region.

In the curved panel of the present disclosure, the pretilt angle of the liquid crystal molecules in the first region and the pretilt angle of the liquid crystal molecules in the second region are symmetrically arranged according to the central region.

In the curved panel of the present disclosure, a distance between two adjacent first liquid crystal molecules is greater than a distance between two adjacent second liquid crystal molecules when the curved panel is in a flat state.

In the curved panel of the present disclosure, the pretilt angle of the first liquid crystal molecules and the pretilt angle of the second liquid crystal molecules located in the central region are 0.

In the curved panel of the present disclosure, the pretilt angle of the first liquid crystal molecules is a, the pretilt angle of the second liquid crystal molecules is b, and $0° \leq a \leq 50°$, $0° \leq b \leq 50°$.

In the curved panel of the present disclosure, the pretilt angle of the liquid crystal molecules in the liquid crystal layer gradually changes from the pretilt angle of the first liquid crystal molecules to the pretilt angle of the second liquid crystal molecules in a direction from the first substrate to the second substrate.

In the curved panel of the present disclosure, the first substrate comprises a first base and a first pixel electrode layer located on the first base, and the second substrate comprises a second base and a second pixel electrode layer located on the second base. The first pixel electrode layer comprises at least two first pixel electrodes, the second pixel electrode layer comprises at least two second pixel electrodes, and an interval between two adjacent first pixel electrodes is greater than an interval between two adjacent second pixel electrodes. Each of the interval of any two adjacent first pixel electrodes is equal, and each of the interval of any two adjacent second pixel electrodes is equal.

In the curved panel of the present disclosure, the first substrate comprises a first salient point of a first base, and the first liquid crystal molecules is located on the first salient point. The second substrate comprises a second salient point of a second base, and the second liquid crystal molecules is located on the second salient point. Wherein an angle between any hypotenuse of the first salient point and the first base is greater than an angle between any hypotenuse of the second salient point and the second base.

The present disclosure further provides a display device comprising a curved panel and a backlight module. The curved panel comprises a first substrate, a second substrate, a liquid crystal layer between the first substrate and the second substrate. The liquid crystal layer comprises a plurality of first liquid crystal molecules near the first substrate, and a plurality of second liquid crystal molecules near the second substrate, wherein one of the first liquid crystal molecules corresponds to one of second liquid crystal molecules. The curved panel comprises a central region, a first region located at one side of the central region, and a second region located at the other side of the central region. The second substrate is disposed near a light-emitting side of the curved panel. Wherein a pretilt angle of the first liquid crystal molecules is greater than a pretilt angle of the second liquid crystal molecules in the first region and the second region.

In the curved panel of the present disclosure, the first substrate is one selected from an array substrate or a color film substrate, the second substrate is one selected from the array substrate or the color film substrate, and the first substrate is the one selected different from the selected one of the second substrate.

In the curved panel of the present disclosure, each of the pretilt angle of any of the first liquid crystal molecules is equal and each of the pretilt angle of any of the second liquid crystal molecules is equal in a direction from the central region to the first region or the second region.

In the curved panel of the present disclosure, the pretilt angle of the liquid crystal molecules in the first region and the pretilt angle of the liquid crystal molecules in the second region are symmetrically arranged according to the central region.

In the curved panel of the present disclosure, a distance between two adjacent first liquid crystal molecules is greater than a distance between two adjacent second liquid crystal molecules when the curved panel is in a flat state.

In the curved panel of the present disclosure, the pretilt angle of the first liquid crystal molecules and the pretilt angle of the second liquid crystal molecules located in the central region are 0.

In the curved panel of the present disclosure, the pretilt angle of the first liquid crystal molecules is a, the pretilt angle of the second liquid crystal molecules is b, and $0°≤a≤50°$, $0≤b≤50°$.

In the curved panel of the present disclosure, the pretilt angle of the liquid crystal molecules in the liquid crystal layer gradually changes from the pretilt angle of the first liquid crystal molecules to the pretilt angle of the second liquid crystal molecules in a direction from the first substrate to the second substrate.

In the curved panel of the present disclosure, the first substrate comprises a first base and a first pixel electrode layer located on the first base, and the second substrate comprises a second base and a second pixel electrode layer located on the second base. The first pixel electrode layer comprises at least two first pixel electrodes, the second pixel electrode layer comprises at least two second pixel electrodes, and an interval between two adjacent first pixel electrodes is greater than an interval between two adjacent second pixel electrodes. Each of the interval of any two adjacent first pixel electrodes is equal, and each of the interval of any two adjacent second pixel electrodes is equal.

In the curved panel of the present disclosure, the first substrate comprises a first salient point of a first base, and the first liquid crystal molecules is located on the first salient point. The second substrate comprises a second salient point of a second base, and the second liquid crystal molecules is located on the second salient point. Wherein an angle between any hypotenuse of the first salient point and the first base is greater than an angle between any hypotenuse of the second salient point and the second base.

In the present disclosure, the pretilt angle of the second liquid crystal molecules near the light-emitting side of the curved panel is less than the pretilt angle of the first liquid crystal molecules away from the light-emitting side, which compensates a misalignment of the pretilt angle of the first liquid crystal molecules and the second liquid crystal molecules caused by bending the curved panel, thereby improving brightness uniformity of curved panels.

DETAILED DESCRIPTION OF PREFERRED EMBODIMENTS

Figure 1:
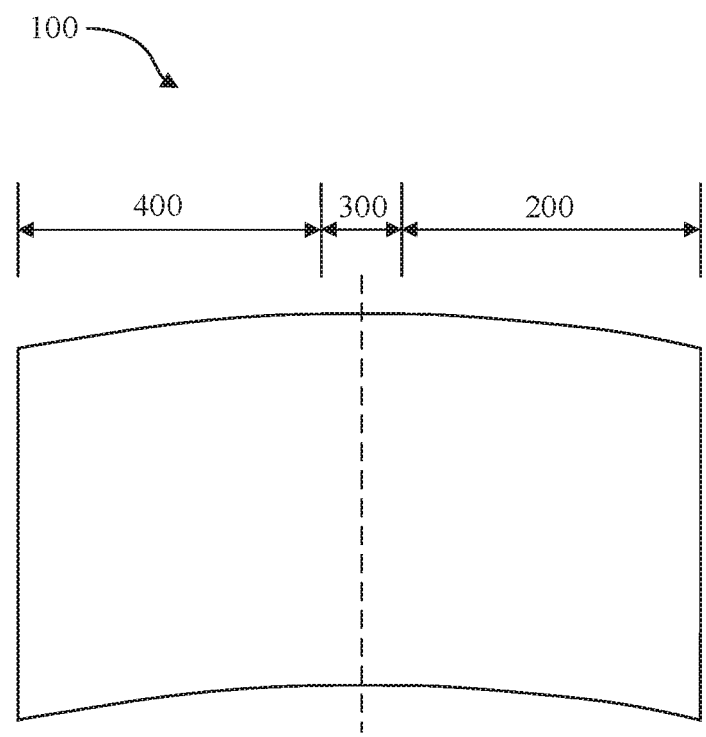
FIG. 1 a top structure diagram of a curved panel of the present disclosure.

In order to make purposes, technical solutions, and effects of the present disclosure more clear and definite, the following further describes the present disclosure in detail with reference to the drawings and examples. Obviously, specific embodiments described here are only used to explain the present disclosure, and are not intended to limit the present disclosure.

Compared to flat liquid crystal display panels, curved liquid crystal display panels have wider-viewing angles and a better three-dimensional effect. Therefore, it can bring a better visual experience to the most users. However, after the curved liquid crystal panels are bending, liquid crystal molecules inside thereof will change optical characteristics due to stress, so that the liquid crystal display panels have problems such as uneven display brightness and reduced sharpness. The present disclosure provides a curved panel based on the above technical problems.

Referring to FIG. 1 to FIG. 4, the curved panel 100 comprises a first substrate 10, a second substrate 20, a liquid crystal layer 30 between the first substrate 10 and the second substrate 20.

The liquid crystal layer 30 comprises a first liquid crystal layer 11 near the first substrate 10, a second liquid crystal layer 12 near the second substrate 20, and a middle layer between the first liquid crystal layer 11 and the second liquid crystal layer 12. The first liquid crystal layer 11 comprises a plurality of first liquid crystal molecules 110, and the second liquid crystal layer 12 comprises a plurality of second liquid crystal molecules 120, wherein one of the first liquid crystal molecules 110 corresponds to one of second liquid crystal molecules 120.

Referring to FIG. 1, the curved panel 100 comprises a central region 300, a first region 200 located at one side of the central region 300, and a second region 400 located at the other side of the central region 300.

In the present embodiment, the second substrate 20 is disposed near a light-emitting side of the curved panel 100.

In the present embodiment, a pretilt angle of the first liquid crystal molecules 110 is greater than a pretilt angle of the second liquid crystal molecules 120 in the first region 200 and the second region 300.

In the present disclosure, the first liquid crystal molecules 110 near the first substrate 10 and the second liquid crystal molecules 120 of the second substrate 20 have different pretilt angles. The pretilt angle of the second liquid crystal molecules 120 near the light-emitting side of the curved panel 100 is less than the pretilt angle of the first liquid crystal molecules 110 away from the light-emitting side, which compensates the misalignment of the pretilt angle of the first liquid crystal molecules 110 and the second liquid crystal molecules 120 caused by bending the curved panel 100, thereby improving brightness uniformity of the curved panel 100.

The technical solutions of the present disclosure are described in combination with specific embodiments.

Embodiment 1

In the present embodiment, the first substrate 10 may be one selected from an array substrate or a color film substrate, the second substrate 20 is one selected from the array substrate or the color film substrate, and the first substrate 10 is the one selected different from the selected one of second substrate 20. For the convenience of description, in the following embodiments, the present disclosure uses the first substrate 10 as the array substrate and the second substrate 20 as the color filter substrate to describe the specific technical solutions.

Figure 2:
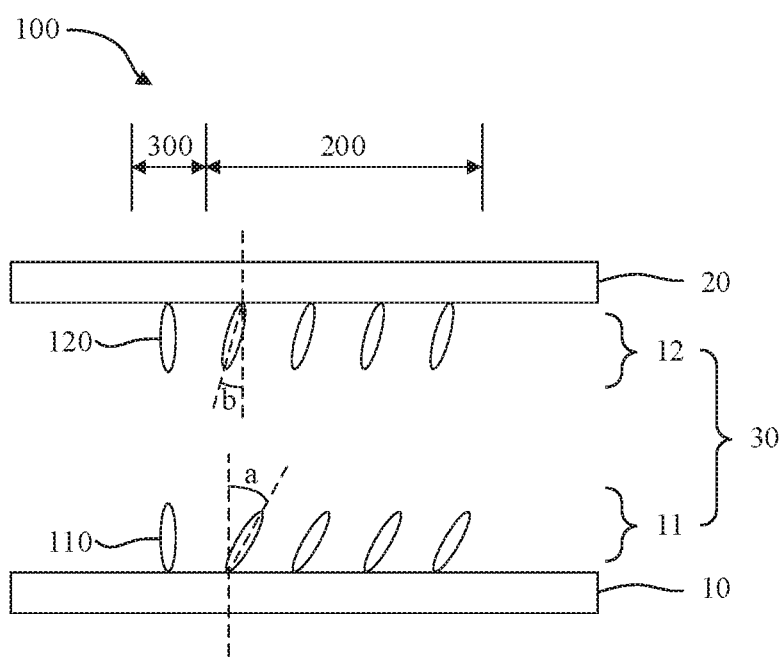
FIG. 2 is a first sectional diagram of the curved panel of the present disclosure.

Referring to FIG. 1 and FIG. 2, each of the pretilt angle of any of the first liquid crystal molecules 110 is equal and each of the pretilt angle of any of the second liquid crystal molecules 120 is equal in a direction from the central region 300 to the first region 200 or the second region 400.

In FIG. 2 of the present embodiment, for the convenience of description, the curved panel 100 is described in a flat state. When the curved panel 100 is changed from a bending state to the flat state, the first liquid crystal molecules 110 and the second liquid crystal molecules 120 rotate with an alignment layer. Therefore, a first pretilt angle difference between the first liquid crystal molecule 110 and the corresponding second liquid crystal molecule 120 on the normal line when the curved screen 100 is in the bending state and a second pretilt angle difference between the first liquid crystal molecule 110 and the corresponding second liquid crystal molecule 120 on the normal line when the curved screen 100 is in the flat state, and the two pretilt angles are equal. The pretilt angle difference between the first liquid crystal molecules 110 and the second liquid crystal molecules 120 does not change with angles of the curved panel.

Taking the liquid crystal molecules in the first region 200 as an example, each of the pretilt angle of any of the first liquid crystal molecules 110 is equal and each of the pretilt angle of any of the second liquid crystal molecules 120 is equal. As may be known in FIG. 2, deflection angles of the first liquid crystal molecules 110 is less than deflection angles of the second liquid crystal molecules 120.

In the present embodiment, the pretilt angle of the first liquid crystal molecules 110 is a, the pretilt angle of the second liquid crystal molecules 120 is b, and $0° \leq a \leq 50°$, $0° \leq b \leq 50°$.

Because the second substrate 20 and the first substrate 10 in the curved panel 100 are in a same arc and the second substrate 20 is close to a light-emitting side, an area of the second substrate 20 is less than an area of the first substrate 10 when a display panel is in the flat state. Because the first liquid crystal molecules 110 and the corresponding second liquid crystal molecules 120 are misaligned, the first liquid crystal molecules 110 and the second liquid crystal molecules 120 at different positions may be on a same normal line after being bending when the curved panel 100 is rolled.

In the present embodiment, a distance between two adjacent first liquid crystal molecules 110 is greater than a distance between two adjacent second liquid crystal molecules 120 when the curved panel is in the flat state. In order to ensure that the first liquid crystal molecules 110 and the second liquid crystal molecules 120 may be on the same normal line after being bending, which is same as the above embodiment.

In the present disclosure, the pretilt angle of the second liquid crystal molecules 120 near the light-emitting side of the curved panel 100 is less than the pretilt angle of the first liquid crystal molecules 110 away from the light-emitting side, which compensates the misalignment of the pretilt angle of the first liquid crystal molecules 110 and the second liquid crystal molecules 120 caused by bending the curved panel, so that the pretilt angle difference between the first liquid crystal molecules 110 and the second liquid crystal molecules 120 reaches a value required by the present disclosure, thereby improving ensuring the uniformity of brightness in each region and improving the user experience.

Embodiment 2

Figure 3:
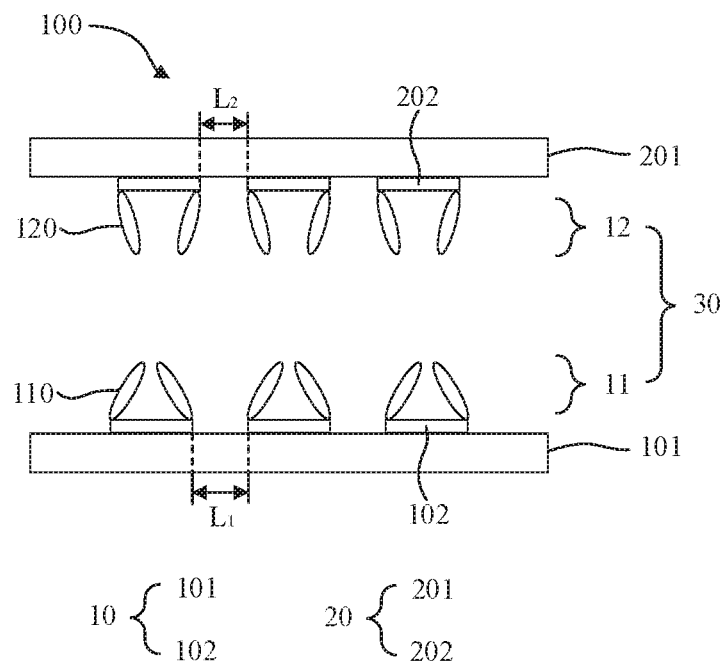
FIG. 3 is a second sectional diagram of the curved panel of the present disclosure.

The present embodiment is same as or similar to the first embodiment, except that the difference is that:

Referring to FIG. 3, based on the first embodiment, the first substrate 10 comprises a first base 101, a first pixel electrode layer located on the first base 101, and a plurality of first liquid crystal molecules 110 located on the first pixel electrode layer. The second substrate 20 comprises a second base 201, a second pixel electrode layer located on the second base 201, and a plurality of second liquid crystal molecules 120 located on the second pixel electrode layer.

In the present embodiment, the first pixel electrode layer may comprise at least two first pixel electrodes 102, and the second pixel electrode layer may comprise at least two second pixel electrodes 202. Each of an interval L1 between two adjacent first pixel electrodes 102 is equal, and each of an interval L2 between two adjacent second pixel electrodes 202 is equal.

In the present embodiment, the interval L1 between two adjacent first pixel electrodes 102 is greater than the interval L2 between two adjacent second pixel electrodes.

Because an area of the first substrate is greater than an area of the second substrate 20, when a display panel is bending, the interval between two adjacent first pixel electrodes 102 in the first substrate 10 is equal to the interval between two adjacent second pixel electrodes 202 in the color film substrate, and there is a misalignment between the first liquid crystal molecules 110 that have been aligned in advance and the corresponding second liquid crystal molecules 120, so that the first liquid crystal molecule 110 cannot not only be aligned with the corresponding second liquid crystal molecules 120 in an angle, but also cannot be aligned in a spatial position, causing the brightness uniformity of the curved panel 100 of the present disclosure to be poor.

In the present disclosure, the interval between adjacent first pixel electrodes 102 in the first substrate 10 is increased, when the display panel is bending, the difference between the interval between two adjacent first pixel electrodes 102 and the interval between two adjacent second pixel electrodes 202 may be compensated by a curvature of the curved panel 100, which ensures that the first liquid crystal molecules 110 and the corresponding second liquid crystal molecules 120 may be aligned in the spatial position, and the brightness uniformity of the curved panel 100 is improved.

Embodiment 3

Figure 4:
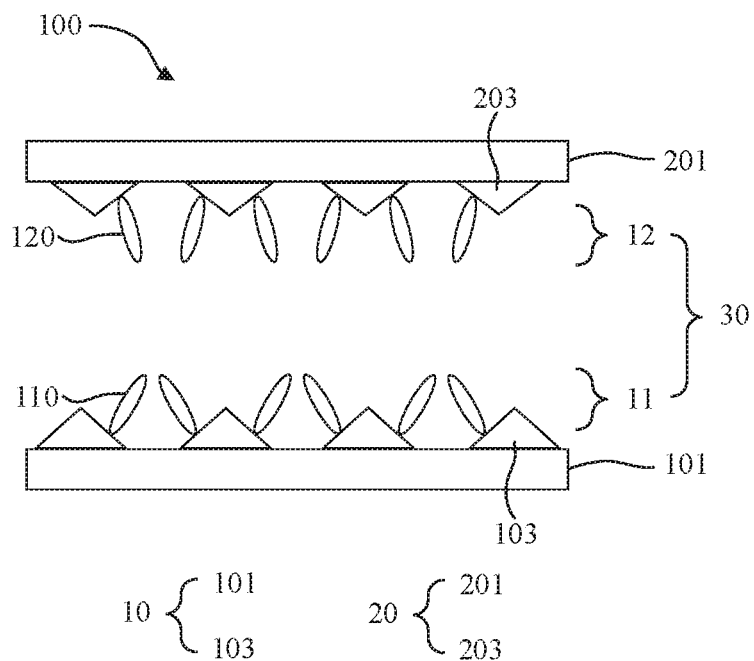
FIG. 4 is a third sectional diagram of the curved panel of the present disclosure.

The present embodiment is same as or similar to the first embodiment and the second embodiment, except that the difference is that:

Referring to FIG. 4, the first substrate 10 further comprises a first protrusion 103 of a first base 101, and the first liquid crystal molecules 110 is located on the first protrusion 103. The second substrate 20 comprises a second protrusion 203 of a second base 201, and the second liquid crystal molecules 120 is located on the second protrusion 203.

In the present embodiment, an angle between any hypotenuse of the first protrusion 103 and the first base 101 is greater than an angle between any hypotenuse of the second protrusion 203 and the second base 201.

In the present embodiment, a cross section of the first protrusion 103 and the second protrusion 203 may be an isosceles triangle, the first liquid crystal molecules 110 are located on any hypotenuse of the first protrusion 103, and the second liquid crystal molecules 120 are located on any hypotenuse of the second protrusion 203.

In the present embodiment, the pretilt angle b of the first liquid crystal molecules 110 or the second liquid crystal molecules 120 is equal to an inclination angle of the hypotenuse of the corresponding protrusion. The present disclosure may adjust the inclination angles of the hypotenuse of the first protrusion 103 and the second protrusion 203 to adjust the pretilt angles b of the first liquid crystal molecules 110 and the second liquid crystal molecules 120, which improves the brightness uniformity of curved panel 100.

In the above embodiment, the pretilt angle b of the first liquid crystal molecules 110 and the second liquid crystal molecules 120 in the first region 200 is equal. Since the central region 300 is located in a middle region of the curved panel 100, its region is a region where the curvature of the curved panel 100 is 0. Therefore, the region is same as the flat display panel. When the first substrate 10 and the second substrate 20 are aligned, there is no technical problem of misalignment.

In the above embodiment, the pretilt angle of the liquid crystal molecules in the first region 200 and the pretilt angle of the liquid crystal molecules in the second region 400 are symmetrically arranged according to the central region 300. Since a shape of the curved panel 100 is symmetrically arranged according to the central region 300, the first region 200 and the second region 400 have the same curvature. Therefore, in the present disclosure, the pretilt angle of the liquid crystal molecules in the first region 200 and the pretilt angle of the liquid crystal molecules in the second region 400 may be symmetrically arranged according to the central region 300.

In the above embodiment, the pretilt angle of liquid crystal molecules in the liquid crystal layer is gradually changed from the pretilt angle a of the first liquid crystal molecules 110 to the pretilt angle b of the second liquid crystal molecules 120 in a direction from the first substrate 10 to the second substrate 20. In order to ensure that a light may smoothly penetrate from the first liquid crystal molecules 110 to the second liquid crystal molecules 120, an angle of the liquid crystal molecules in the middle layer gradually changes from the pretilt angle a of the first liquid crystal molecules 110 to the pretilt angle b of the second liquid crystal molecules 120.

The present disclosure further provides a display device, and the display device comprises the curved panel and a backlight module. Based on the above embodiments, the present embodiment may perform partition control on the backlight of the curved panel. Because the brightness of different region is different due to different curvatures, the backlight intensity in the backlight module may be increased according to the change law of the curvature. For example, in a direction from the central region to the first region or the second region, the backlight intensity in the backlight module is gradually increased to compensate for the technical problem of the brightness reduction of the curved panel due to the increased curvature.

The present disclosure provides a curved panel and a display device that comprise a first substrate, a second substrate, and a liquid crystal. The liquid crystal layer comprises a plurality of first liquid crystal molecules near the first substrate, and plurality of second liquid crystal molecules near the second substrate, wherein one of the first liquid crystal molecules corresponds to one of second liquid crystal molecules. The curved panel comprises a central region, a first region located at one side of the central region, and a second region located at the other side of the central region. The second substrate is disposed near a light-emitting side of the curved panel. A pretilt angle of the first liquid crystal molecules is greater than a pretilt angle of the second liquid crystal molecules in the first region and the second region. In the present disclosure, the pretilt angle of the second liquid crystal molecules near the light-emitting side of the curved panel is less than the pretilt angle of the first liquid crystal molecules away from the light-emitting side, which compensates a misalignment of the pretilt angle of the first liquid crystal molecules and the second liquid crystal molecules caused by bending the curved panel, thereby improving brightness uniformity of curved panels.

It should be noted that for those of ordinary skill in the art, equivalent replacements or changes can be made according to the technical solutions of the present disclosure and its inventive concept, and all these changes or replacements should fall within the protection scope of the claims attached to the present disclosure.

What is claimed is:

1. A curved panel, comprising:
a first substrate, a second substrate, and a liquid crystal layer between the first substrate and the second substrate;
wherein the liquid crystal layer comprises a plurality of first liquid crystal molecules near the first substrate and a plurality of second liquid crystal molecules near the second substrate, and one of the first liquid crystal molecules corresponds to one of the second liquid crystal molecules;
the curved panel comprises a central region, a first region located at one side of the central region, and a second region located at another side of the central region;
the second substrate is disposed near a light-emitting side of the curved panel;
a pretilt angle of the first liquid crystal molecules is greater than a pretilt angle of the second liquid crystal molecules in the first region and the second region; and
a distance between two adjacent first liquid crystal molecules is greater than a distance between two adjacent second liquid crystal molecules when the curved panel is in a flat state.

2. The curved panel as claimed in claim 1, wherein the first substrate is one selected from an array substrate or a color film substrate, the second substrate is one selected from the array substrate or the color film substrate, and the first substrate is different from the second substrate.

3. The curved panel as claimed in claim 2, wherein each pretilt angle of the first liquid crystal molecules is equal and each pretilt angle of the second liquid crystal molecules is equal in a direction from the central region to the first region or the second region.

4. The curved panel as claimed in claim 2, wherein a pretilt angle of liquid crystal molecules in the first region and a pretilt angle of the liquid crystal molecules in the second region are symmetrical about the central region.

5. The curved panel as claimed in claim 2, wherein the pretilt angle of the first liquid crystal molecules and the pretilt angle of the second liquid crystal molecules located in the central region are 0.

6. The curved panel as claimed in claim 2, wherein a pretilt angle of liquid crystal molecules in the liquid crystal layer gradually changes from the pretilt angle of the first liquid crystal molecules to the pretilt angle of the second liquid crystal molecules in a direction from the first substrate to the second substrate.

7. The curved panel as claimed in claim 2, wherein the first substrate comprises a first base and a first pixel electrode layer located on the first base, and the second substrate comprises a second base and a second pixel electrode layer located on the second base;

the first pixel electrode layer comprises at least two first pixel electrodes, the second pixel electrode layer comprises at least two second pixel electrodes, and an interval between two adjacent first pixel electrodes is greater than an interval between two adjacent second pixel electrodes; and each interval of any two adjacent first pixel electrodes is equal, and each interval of any two adjacent second pixel electrodes is equal.

8. The curved panel as claimed in claim 2, wherein the first substrate comprises a first base having first protrusions, and the first liquid crystal molecules are located on the first protrusions; and the second substrate comprises a second base having second protrusions, and the second liquid crystal molecules are located on the second protrusions;

wherein an angle between any hypotenuse of the first protrusions and the first base is greater than an angle between any hypotenuse of the second protrusions and the second base.

9. The curved panel as claimed in claim 1, wherein the pretilt angle of the first liquid crystal molecules is a, the pretilt angle of the second liquid crystal molecules is b, and $0°\leq a\leq 50°$, $0°\leq b\leq 50°$.

10. A display device, comprising a curved panel and a backlight module, wherein the curved panel comprises a first substrate, a second substrate, and a liquid crystal layer between the first substrate and the second substrate;

the liquid crystal layer comprises a plurality of first liquid crystal molecules near the first substrate and a plurality of second liquid crystal molecules near the second substrate, and one of the first liquid crystal molecules corresponds to one of the second liquid crystal molecules;

the curved panel comprises a central region, a first region located at one side of the central region, and a second region located at another side of the central region;

the second substrate is disposed near a light-emitting side of the curved panel;

wherein a pretilt angle of the first liquid crystal molecules is greater than a pretilt angle of the second liquid crystal molecules in the first region and the second region; and a distance between two adjacent first liquid crystal molecules is greater than a distance between two adjacent second liquid crystal molecules when the curved panel is in a flat state.

11. The display device as claimed in claim 10, wherein the first substrate is one selected from an array substrate or a color film substrate, the second substrate is one selected from the array substrate or the color film substrate, and the first substrate is different from the second substrate.

12. The display device as claimed in claim 11, wherein each pretilt angle of the first liquid crystal molecules is equal and each pretilt angle of the second liquid crystal molecules is equal in a direction from the central region to the first region or the second region.

13. The display device as claimed in claim 11, wherein a pretilt angle of liquid crystal molecules in the first region and a pretilt angle of the liquid crystal molecules in the second region are symmetrical about the central region.

14. The display device as claimed in claim 11, wherein the pretilt angle of the first liquid crystal molecules and the pretilt angle of the second liquid crystal molecules located in the central region are 0.

15. The display device as claimed in claim 11, wherein a pretilt angle of liquid crystal molecules in the liquid crystal layer gradually changes from the pretilt angle of the first liquid crystal molecules to the pretilt angle of the second liquid crystal molecules in a direction from the first substrate to the second substrate.

16. The display device as claimed in claim 11, wherein the first substrate comprises a first base and a first pixel electrode layer located on the first base, and the second substrate comprises a second base and a second pixel electrode layer located on the second base;

the first pixel electrode layer comprises at least two first pixel electrodes, the second pixel electrode layer comprises at least two second pixel electrodes, and an interval between two adjacent first pixel electrodes is greater than an interval between two adjacent second pixel electrodes; and each interval of any two adjacent first pixel electrodes is equal, and each interval of any two adjacent second pixel electrodes is equal.

17. The display device as claimed in claim 11, wherein the first substrate comprises a first base having first protrusions, and the first liquid crystal molecules are located on the first protrusions; and the second substrate comprises a second base having second protrusions, and the second liquid crystal molecules are located on the second protrusions;

wherein an angle between any hypotenuse of the first protrusions and the first base is greater than an angle between any hypotenuse of the second protrusions and the second base.

18. The display device as claimed in claim 10, wherein the pretilt angle of the first liquid crystal molecules is a, the pretilt angle of the second liquid crystal molecules is b, and $0°\leq a\leq 50°$, $0°\leq b\leq 50°$.

* * * * *